Dec. 9, 1958   E. SCHRÖDER   2,863,318
DIFFERENTIAL PRESSURE PRODUCER
Filed June 10, 1954

INVENTOR:
EDGAR SCHRÖDER
BY:

United States Patent Office 2,863,318
Patented Dec. 9, 1958

2,863,318
DIFFERENTIAL PRESSURE PRODUCER

Edgar Schröder, Mannheim, Germany, assignor to Firma Bopp & Reuther G. m. b. H., Mannheim-Waldhof, Germany Application June 10, 1954, Serial No. 435,895

Claims priority, application Germany June 15, 1953

10 Claims. (Cl. 73—213)

The present invention relates to differential pressure producers for flowing fluids, and more particularly to a differential pressure producer of the venturi tube type provided with a constricting body in the throat portion of the venturi tube for increasing the pressure differential.

Apparatus for measuring of fluid flow by means of the differential pressure principle requires a device in the flow main which produces a differential pressure dependent on the rate of flow, and a measuring instrument actuated by this differential pressure. Particularly advantageous are the venturi tube type differential pressure producers since they have very low overall pressure losses.

Two types of venturi tubes for this purpose are known, namely the long venturi tube, and the short venturi tube. For practical purposes a short venturi tube is more widely used since it combines a shorter overall length with only slightly higher pressure losses. Although the pressure losses of differential pressure producers of this type are low, nevertheless even lower pressure losses are desirable for the measuring of fluid flow.

Flow measuring by means of a static tube flow-meter such as the Prandtl impact tube can be carried out practically without any losses. However, aside from the limited available effective pressure, it is disadvantageous that the port of an impact tube is easily clogged. Also, projecting impact tubes of this type are sometimes damaged by foreign bodies moving with the flowing fluid.

It is also known to use flow tubes for measuring fluid flow in which on the inner periphery of a tubular element two groups of pressure ports extending in opposite directions at an acute angle to the flow are provided, one group of ports facing upstream, and the other group of ports facing downstream so that the differential pressure is determined by the throat velocity. It is also known to provide such pressure ports in nozzles projecting from the inner periphery of the tube member. However, flow tubes of this type are depending on the distribution of the velocity in the peripheral zone of the tube, which is particularly disadvantageous when the flow is turbulent. If this is the case, the distribution and position of the measuring ports along the periphery of the flow tube has an additional influence. Devices of this type are also subject to clogging by impurities.

Another differential pressure producer according to the known art provides instead of the curved profile which is characteristic of the venturi tube, a conical converging portion directly following a cylindrical upstream portion, and ending at a narrow constricted cylindrical portion having the smallest diameter of a downstream diverging conical portion. In devices of this type the upstream high pressure tapping for the measuring instrument is located directly upstream of the conical converging portion, that is in a place in which the effective pressure is highest. In the conical converging portion, the velocity of the flow is increased, and the low pressure tapping for the measuring instrument is located in the narrow cylindrical throat portion of the device in the region of greatest constriction.

It is the object of the present invention to improve differential pressure producers for flowing fluids by increasing the differential pressure between the high pressure tapping and the low pressure tapping as compared with the differential pressure produced by the normal venturi tube type arrangement.

It is another object of the present invention to provide in a venturi tube type differential pressure producer in the throat portion of the venturi tube at least one constricting body in which the port for the low pressure tapping is located.

It is a further object of the present invention to provide at least one streamlined constricting body in the throat portion of the venturi tube and to arrange at least one low pressure tapping port on a surface portion of the constricting body along which the flow velocity of a part of the fluid is increased to the highest extent.

It is a still further object of the present invention to use the lower pressure created by the local velocity increase of the fluid along the streamlined constricting body for increasing the pressure differential, while increasing the overall pressure loss only negligibly as compared with a normal venturi tube device in which the same pressure differential is to be obtained by reducing the diameter of the smaller end of the converging portion of the venturi tube.

With these objects in view the present invention mainly consists in a differential pressure producer for flowing fluids which comprises, in combination, a tubular means including a venturi tube-shaped inner surface section having a throat portion; a high pressure tapping means in the tubular means located upstream of the throat portion; at least one constricting body in the tubular means located in the region of the throat portion and reducing the cross-section of the same so that along at least one surface portion of the constricting body the flow velocity of the fluid is increased, the constricting body having port means located in the surface portion thereof; and low pressure tapping means in the tubular means and communicating with the port means in the constricting body.

The local increase of flow velocity of a part of the fluid, and the local reduction of the pressure can be obtained according to the present invention by arranging a streamlined constricting body in the center of the throat cross-section. In another embodiment, a constricting bar having a streamlined cross-section extends diametrically through the throat. According to a further embodiment, a plurality of streamlined constricting bodies are arranged in the throat region of the venturi tube peripherally spaced from each other in order to prevent damage to the constricting bodies by foreign bodies.

Preferably however, the constricting body is an annular streamlined projection located in the throat region of the venturi tube, and constituting a smaller second venturi tube in the main venturi tube. The streamlined projection has preferably a radially extending annular slot communicating with the low pressure tapping.

The differential pressure producer according to the present invention produces with greater diameter ratios and substantially smaller pressure losses the same effective pressure differentials as devices according to the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
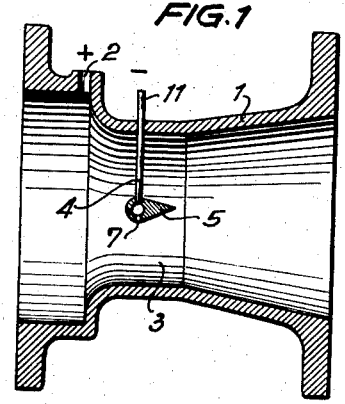
Fig. 1 is a longitudinal view of an embodiment of the present invention.

Referring now to the drawings, and more particularly to Fig. 1 in a tubular means a "short" venturi tube surface 1 and an upstream high pressure tapping 2 are provided. In the throat 3 of the venturi tube 1, a tubular support 4 is provided which carries on its free end a streamlined constricting body 5. A port 7 communicates with the low pressure tapping for the measuring instrument. It will be understood that the high pressure and low pressure tappings will be connected to a suitable flowmeter, such as a manometric type measuring instrument which is actuated by the differential pressure between the plus pressure at 2 and the minus pressure at 7. The streamlined constricting body 5 produces a local increase of velocity of the flowing fluid which is deflected along the surface of the constricting body. At the surface portion of the constricting body on which the flow velocity of the fluid is most increased since the cross-section of the throat is most reduced, the port 7 is placed. The locally increased flow velocity increases the pressure differential between the low pressure and high pressure tappings without substantially increasing the flow losses. To obtain the same pressure differential by means of a normal venturi tube, the throat of the venturi tube would have to be constricted to such extent that the overall losses would be much higher than the losses occurirng in the construction of the present invention in which the flow velocity of only a part of the flowing fluid is increased along the streamlined constricting body.

While the embodiment of the present invention shown in Fig. 1 resembles in shape a Prandtl impact tube, it is a differential pressure producer since high pressure tapping means are provided. The construction of this embodiment is simple but the arrangement can only be used for fluids which are free of foreign bodies since the tubular support 4 is subject to damage by bodies floating in the liquid fluid.

Figure 2:
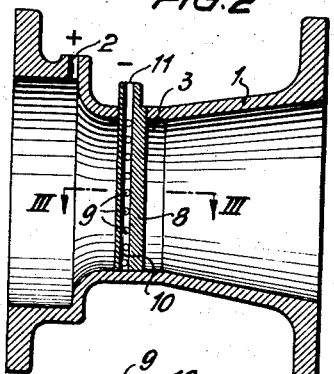
Fig. 2 is a longitudinal view through another embodiment of the present invention.
Figure 3:
Fig. 3 is a cross-sectional view on line III—III in Fig. 2 on an enlarged scale.

In the modified embodiment shown in Figs. 2 and 3, the streamlined constricting body is a bar 8 having streamlined cross-section as best seen in Fig. 3 and passing diametrically through the throat of the venturi tube 1. A row of spaced ports 9 are arranged on each side of the bar 8 at the most constricting surface portions along which the increase of the flow velocity of the fluid is highest. The ports 9 communicate with a longitudinal conduit 10 which ends in low pressure tapping means 11. High pressure tapping means 2 are used together with the low pressure tapping means 11 for connecting the differential pressure producer to a measuring instrument.

Figures 4, 5:
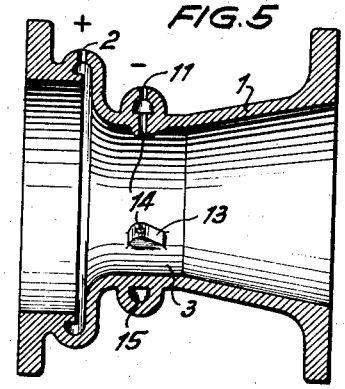
Fig. 4 is a longitudinal sectional view of a further embodiment of the present invention.
Fig. 5 is a longitudinal sectional view of a modification of the embodiment of Fig. 4.

In the embodiment shown in Fig. 4, a plurality of spaced streamlined constricting bodies 5 is arranged in the throat 3 of a short venturi tube 1 and supported on comparatively short tubular supports 12. The constricting bodies are again provided with ports 7 which communicate through longitudinal conduits 11a in the tubular supports 12 with the low pressure tapping means 11 which include an annular conduit means 11' formed with an annular conduit 15 connecting the conduits 11a in the tubular supports 12 with the low pressure tapping means 11. A similar annular conduit 2' is provided upstream of the throat 3 and communicates with an annular slot 2a formed in the tubular means at a point located upstream of the converging portion 1a of the venturi tube surface. The high pressure tapping means 2 are constituted by a bore connecting the outside of the tubular means with the annular conduit 2'.

In the modified embodiment of Fig. 5, the tubular supports 12 shown in Fig. 4 are omitted, and the streamlined constricting bodies 13 are arranged peripherally spaced from each other along the periphery of the inner throat surface 3. The streamlined bodies 13 constitute streamlined projections in the throat and are provided with ports 14 which are located on surface portions of the streamlined constricting bodies which constrict the fluid to the highest extent, and consequently produce an increase of the flow velocity of the fluid as compared to the velocity along the remaining peripheral surface of the throat 3.

Figure 6:
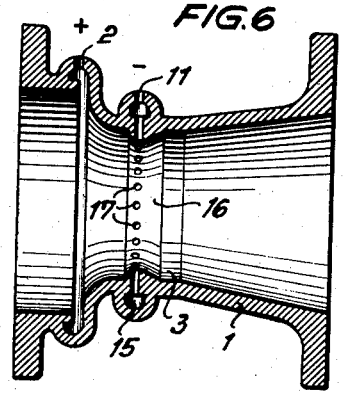
Fig. 6 is a longitudinal sectional view of an embodiment having an annular constricting body.

In the embodiment shown in Fig. 6 an annular streamlined body 16 is provided in the throat 3 of the venturi tube, which corresponds to the construction of Fig. 5 if the number of constricting bodies 13 is so increased that they form together an integral annular streamlined body 16. Ports 17 are provided in the annular surface portion of the annular constricting body 16 which constricts the throat to the highest extent so that along such surface portions the flow velocity is increased as compared with the normal flow velocity on the throat surface of a venturi tube. Consequently, the pressure differential between the low pressure tapping 11 and the high pressure tapping 2 is increased, while the overall losses are substantially reduced as compared with a normal venturi tube producing the same pressure differential without having a local constriction in the throat portion. Similar to the embodiment shown in Fig. 4, an annular conduit means 11' connects the ports 17 and communicates with low pressure tapping means 11.

Figure 7:
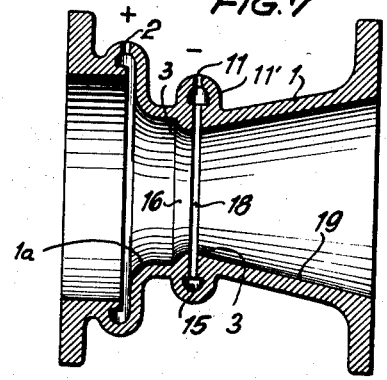
Fig. 7 is a longitudinal sectional view of a preferred embodiment of the present invention.

In the embodiment shown in Fig. 7, instead of a row of ports, a single annular slot 18 is provided in the annular streamlined constricting body 16 which extends perpendicular to the axis of the venturi tube and communicates with annular conduit means 11'. Low pressure tapping means 11 are provided in the form of a bore connecting the annular conduit 15 in the conduit means 11' with the outer surface of the tubular means. High pressure tapping means 2 are provided in the tubular means upstream of the converging portion 1a of the venturi tube and have the shape of an annular slot extending perpendicular to the axis of the venturi tube and communicating with a bore ending on the outer surface of the tubular means 1.

In the embodiment of Fig. 7, the streamlined constricting body 16 is so shaped that its downstream surface merges into the diverging part 19 of the venturi tube while the upstream surface of the constricting body 16 forms a streamlined shoulder in the throat 3 of the venturi tube which constitutes a second short more sharply converging portion downstream of the converging portion 1a of the main venturi tube.

All embodiments of the present invention have in common that a streamlined constricting body arranged in the throat portion of a venturi tube produces a local increase of flow velocity which is utilized for obtaining a greater pressure differential for measuring fluid flow without substantially increasing the overall losses of the arrangement.

In the embodiment of Fig. 7, the pressure differential depends on the ratio of the consecutive constrictions. If the aperture ratio of the main venturi tube is $$m_0 = \left(\frac{d_0}{D}\right)^2$$

and the aperture ratio of the double venturi construction shown in Fig. 7 is $$m = \left(\frac{d}{D}\right)^2$$

the gain in differential pressure depends on the ratio $$\frac{m^0}{m}$$

This ratio can be kept constant for all aperture ratios $m$. In the above equations, D is the diameter at the high pressure tapping, $d^0$ the diameter of the throat, and $d$ is the diameter of the constricting projection.

For a wide range of medium and great aperture ratios, the advantage of the double venturi tube of the present invention as compared with the normal venturi tube resides therein that the pressure differential is increased 1.82 times at the same aperture ratio. The pressure loss with reference to the pressure differential consequently drops to approximately 55% so that the losses are reduced at least 45%.

It will be understood that each of the elements described above, or two or more together, may also find a useful application in other types of differential pressure producers differing from the types described above.

While the invention has been illustrated and described as embodied in a differential pressure producer comprising a streamlined annular constricting body in the throat of a venturi tube, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a flow measuring arrangement, a differential pressure producer for flowing fluids and comprising, in combination, a tubular means including a venturi tube-shaped inner surface section having a throat portion in which the flow velocity of all the fluid flowing therethrough is increased; a high pressure tapping means in said tubular means located upstream of said throat portion; at least one streamlined deflecting body in said tubular means located substantially at the downstream end of said throat portion and having an outer streamlined surface portion extending for a short distance in flow direction for locally reducing the cross-section of the same at least in flow direction so that the flow velocity of the part of the fluid flowing along said surface portion of said body is further increased, said body having port means located in said surface portion thereof; and low pressure tapping means in said tubular means and communicating with said port means in said body so that the fluid pressure in said low pressure tapping means only depends on the flow velocity of said part of the fluid and is smaller than the fluid pressure of the fluid flowing in said throat portion spaced from said surface portion of said body.

2. In a flow measuring arrangement, a differential pressure producer for flowing fluids and comprising, in combination, a tubular means including a venturi tube-shaped inner surface section having a throat portion in which the flow velocity of all the fluid flowing therethrough is increased; a high pressure tapping means in said tubular means located upstream of said throat portion; at least one streamlined deflecting body in said tubular means located in the axis of said throat portion and having an outer streamlined surface portion extending for a short distance in flow direction for locally reducing the cross-section of the same at least in flow direction so that the flow velocity of the part of the fluid flowing along said surface portion of said body is further increased, said body having port means located in said surface portion thereof; and low pressure tapping means in said tubular means and communicating with said port means in said body so that the fluid pressure in said low pressure tapping means only depends on the flow velocity of said part of the fluid and is smaller than the fluid pressure of the fluid flowing in said throat portion spaced from said surface portion of said body.

3. In a flow measuring arrangement, a differential pressure producer for flowing fluids and comprising, in combination, a tubular means including a venturi tube-shaped inner surface section having a throat portion in which the flow velocity of all the fluid flowing therethrough is increased; a high pressure tapping means in said tubular means located upstream of said throat portion; at least one bar secured to said tubular means and having a streamlined cross-section, said bar passing diametrically through said tubular means in the region of said throat portion and having lateral outer surface portions for locally reducing the cross section of said throat portion, said lateral streamlined surface portions extending a short distance in flow direction so that along said lateral surface portions of said bar the flow velocity of a part of the fluid is further increased, said bar having two rows of longitudinally spaced ports located in said lateral surface portions thereof and being formed with a longitudinal conduit communicating with said ports; and low pressure tapping means in said tubular means communicating with said conduit in said bar so that the fluid pressure in said low pressure tapping means only depends on the velocity of said part of the fluid and is smaller than the pressure of the fluid flowing in said throat portion spaced from said surface portions of said bar.

4. In a flow measuring arrangement, a differential pressure producer for flowing fluids and comprising, in combination, a tubular means including a venturi tube-shaped inner surface section having a throat portion in which the flow velocity of all the fluid flowing therethrough is increased; a high pressure tapping means in said tubular means located upstream of said throat portion; a plurality of spaced streamlined solid deflecting bodies located in the region of said throat portion spaced from the surface thereof, each of said solid bodies having an outer streamlined surface portion extending a short distance in flow direction for locally reducing the cross-section of said throat portion so that along said surface portions the flow velocity of a part of the fluid in said throat portion is further increased, each of said bodies having at least one port in the respective surface portion thereof; a plurality of tubular supports on said tubular means inwardly projecting in radial direction from said throat portion and respectively supporting one of said bodies, each of said supports being formed with a conduit communicating with the respective port; annular conduit means on said tubular means formed with an annular conduit connecting said conduits in said tubular supports; and low pressure tapping means in said tubular means communicating with said annular conduit so that the fluid pressure in said low pressure tapping means only depends on the velocity of said part of the fluid and is smaller than the pressure of the fluid flowing in said throat portion spaced from said surface portions of said bodies.

5. In a flow measuring arrangement, a differential pressure producer for flowing fluids and comprising, in combination, a tubular means including a venturi tube-shaped inner surface section having a throat portion in which the flow velocity of all the fluid flowing therethrough is increased; a high pressure tapping means in said tubular means located upstream of said throat portion; a plurality of circumferentially spaced streamlined deflecting projections located in the region of said throat portion inwardly projecting from said inner surface section, each of said projections having an outer streamlined surface portion inwardly projecting from said inner surface section end, extending a short distance in flow direction for locally reducing the cross-section of said throat portion so that along said surface portions of said projections the flow velocity of a part of the fluid in said throat portion is further increased, each of said projections having at least one port in the respective surface portion thereof; and low pressure tapping means in said tubular means communicating with said ports so that the fluid pressure in said low pressure tapping means only depends on the velocity of said part of the fluid and is smaller than the pressure of the fluid flowing in said throat portion spaced from said surface portions of said bodies.

6. In a flow measuring arrangement, a differential pressure producer for flowing fluids and comprising, in combination, a tubular means including a venturi tube-shaped inner surface section having a throat surface portion within which the flow velocity of all the fluid flowing therethrough is increased; a high pressure tapping means in said tubular means located upstream of said throat portion; at least one annular deflecting body in said tubular means extending around said throat surface portion inwardly projecting therefrom and having at least one annular surface portion extending a short distance in flow direction for locally reducing the cross-section bounded by said throat surface portion so that the flow velocity of the part of the fluid flowing along said annular surface portion of said body is further increased, said annular body having port means located in said annular surface portion thereof; and low pressure tapping means in said tubular means and communicating with said port means in said annular body so that the fluid pressure in said low pressure tapping means only depends on the flow velocity of said part of the fluid and is smaller than the fluid pressure of the fluid flowing in said throat portion spaced from said annular surface portion of said body.

7. In a flow measuring arrangement, a differential pressure producer for flowing fluids and comprising, in combination, a tubular means including a venturi tube-shaped inner surface section having an upstream converging surface portion, a throat surface portion and a downstream diverging surface portion so that the flow velocity of all the fluid flowing within said throat surface portion is increased; a high pressure tapping means in said tubular means located upstream of said converging portion; an annular inwardly projecting streamlined deflecting shoulder in said throat surface portion for locally reducing the cross-section bounded by said throat surface portion in flow direction so that the flow velocity of the part of the fluid flowing along said shoulder is further increased, said annular shoulder having port means; and low pressure tapping means in said tubular means and communicating with said port means so that the fluid pressure in said low pressure tapping means only depends on the flow velocity of said part of the fluid and is smaller than the fluid pressure of the fluid showing in said throat portion spaced from said annular shoulder.

8. In a flow measuring arrangement, a differential pressure producer for flowing fluids and comprising, in combination, a tubular means including a venturi tube-shaped inner surface section having an upstream converging surface portion, a throat surface portion and a downstream diverging surface portion so that the flow velocity of all fluid flowing within said throat surface portion is increased; a high pressure tapping means in said tubular means located upstream of said converging surface portion; an annular inwardly projecting streamlined deflecting shoulder in said throat surface portion for locally reducing the cross-section of said throat surface portion in flow direction so that the flow velocity of the part of the fluid flowing along said shoulder is further increased, said annular shoulder being formed with an annular slot having an annular port; and low pressure tapping means in said tubular means and communicating with said annular slot so that the fluid pressure in said low pressure tapping means only depends on the flow velocity of said part of the fluid and is smaller than the fluid pressure of the fluid flowing in said throat portion spaced from said annular shoulder.

9. In a flow measuring arrangement, a differential pressure producer for flowing fluids and comprising, in combination, a tubular means including a venturi tube-shaped inner surface section having an upstream converging surface portion, a cylindrical throat surface portion and a downstream diverging surface portion so that the flow velocity of all the fluid flowing within said throat portion is increased; a high pressure tapping means in said tubular means located upstream of said converging surface portion; an annular streamlined deflecting shoulder in said cylindrical throat surface portion inwardly projecting from the same and being shorter in flow direction than said cylindrical throat surface portion for locally reducing the cross-section of said throat portion in flow direction so that the flow velocity of the part of hte fluid flowing along said shoulder is further increased, said annular shoulder having port means; and low pressure tapping means in said tubular means and communicating with said port means so that the fluid pressure in said low pressure tapping means only depends on the flow velocity of said part of the fluid and is smaller than the fluid pressure of the fluid flowing in said throat portion spaced from said annular shoulder.

10. In a flow measuring arrangement, a differential pressure producer for flowing fluids and comprising, in combination, a tubular means including a venturi tube-shaped inner surface section having an upstream converging surface portion, an intermediate throat surface portion and a downstream diverging surface portion so that the flow velocity of all the fluids flowing within said throat surface portion is increased; a high pressure tapping means in said tubular means located upstream of said converging surface portion; at least one deflecting projection in said tubular means located in the region of said throat surface portion inwardly projecting from the same, and having a streamlined surface portion inwardly projecting from said inner surface section and extending a short distance in flow direction for locally reducing the cross section bounded by said throat surface portion so that the flow velocity of the part of the fluid flowing along said surface portion of said body is further increased said surface portion of said projection having port means; and low pressure tapping means in said tubular means and communicating with said port means so that the fluid pressure in said low pressure tapping means only depends on the flow velocity of said part of the fluid and is smaller than the fluid pressure of the fluid flowing within said throat surface portion spaced from said surface portion of said deflecting projection.

References Cited in the file of this patent

UNITED STATES PATENTS

| | | |
|---|---|---|
| 2,229,819 | Reid | Jan. 28, 1941 |
| 2,283,021 | Udale | May 12, 1942 |
| 2,361,993 | Chandler | Nov. 7, 1944 |
| 2,456,626 | Dahnke | Dec. 21, 1948 |
| 2,482,528 | Wiegand et al. | Sept. 20, 1949 |
| 2,704,555 | Dall | Mar. 22, 1955 |

FOREIGN PATENTS

| | | |
|---|---|---|
| 200,994 | Great Britain | July 26, 1923 |
| 473,562 | Great Britain | Oct. 15, 1937 |